DIGITAL STREAM SELECTIVE CALLING SYSTEM

Filed May 10, 1967 2 Sheets-Sheet 1

INVENTOR.
JERRY GORDON
BY
Stanley M. Schwartz
ATTORNEY

INVENTOR.
JERRY GORDON
BY
Stanley M. Schurgin
ATTORNEY

United States Patent Office
3,510,777
Patented May 5, 1970

3,510,777
DIGITAL STREAM SELECTIVE CALLING SYSTEM
Jerry Gordon, Williamsville, N.Y., assignor to Corn Products Company, New York, N.Y., a corporation of Delaware
Filed May 10, 1967, Ser. No. 637,464
Int. Cl. H04b 7/02; H04j 3/12
U.S. Cl. 325—55 17 Claims

ABSTRACT OF THE DISCLOSURE

A selective calling system in which the signal transmitted to call an individual receiver or group of receivers out of a larger group of receiving stations comprises a digital code stream consisting of a continuously repeating binary code word, uninterrupted by spacing intervals or synchronizing pulses. The call signal encoder includes a shift register having a feedback path connecting it as a ring counter so that, after being loaded with a selected code word, the application of shift pulses will cause the register to recirculate the selected code word and thus generate the desired code stream. Each receiver in the system has a call signal decoder which includes a shift register into which the received code stream is serially loaded and a diode logic circuit connected to monitor the contents of the register and generate a signal upon recognizing the reception of a code word unique to that receiver or receiver group.

BACKGROUND OF THE INVENTION

This invention relates to communication systems, and more particularly to a selective calling system in which a particular receiver, or group of receivers, among many similar receivers is notified by means of a digitally coded signal that it is being called by a transmitter associated with the system.

Selective calling systems are useful in many applications, one of which is two-way radio communications between a base station and a number of fixed or mobile remote stations. Each remote station includes a radio receiver and selective calling decoder. The radio receiver unit receives both calling and voice signals. The calling signals are routed to the decoder, which provides a suitable output upon reception of a call code identified with that station. The output may operate an alarm device to alert the operator that the station has been called, or it may condition the radio receiver for reception of a message. The selective calling decoder, therefore, makes it possible to call any individual remote station from the base station.

Conventional calling systems often employ a vibrating reed type decoder which actuates an alarm in response to the reception of a particular frequency or a coded combination of different frequencies. These systems have the obvious disadvantage of requiring the use of a multiplicity of frequencies in an already overcrowded frequency spectrum. Further, such systems require rather complicated base station transmitter equipment in order to provide the capability of calling a large number of remote stations.

An approach directed toward overcoming the disadvantages of a multiple frequency system is to employ a digital calling system in which the receiving station decoders are responsive to a binary code made up of the presence or absence of a single radio frequency tone. Previously proposed binary coded signalling systems, however, have been so complex and costly as to make their use impractical for the more common selective call applications. For example, one known type of digital system employs one or more ring counters, or storage devices, and a complex network of comparison and logic circuits to implement the encoder-decoder circuitry. In addition, the system requires that an auxiliary signal, such as a standby or readout signal, a synchronizing pulse, or a group of preamble pulses, be transmitted along with the binary call code; this results in added circuit complexity. Further, many of the prior art systems do not have a group call capability, and where such is provided, it requires still additional decoder circuitry or the use of a conference call code of rather inflexible and limited application.

Another consideration in the use of binary modulated carrier signals is to provide means to avoid calling the wrong station due to noise interference of the transmitted code signal. Some of the earlier systems counter this problem by the use of elaborate error correction schemes, while others retransmit the code signal to the base station for verification prior to message transmission.

SUMMARY OF THE INVENTION

The present invention overcomes the aforementioned disadvantages of the prior art by providing a selective calling system marked by equipment simplicity, yet including both false alarm protection and a flexible group and subgroup call capability. These objects are attained by transmitting as the call signal a digital address stream consisting of a continuously repeating address word composed of a selected $n$-bit sequence of binary information. The number of different address streams available is dependent on the length of the repeating word and may be readily determined therefrom. The encoder for generating any of the selected address streams comprises a shift register having $n$ bistable elements and a feedback path connected from the first to $n^{th}$ element, an address selector for parallel loading of a preset binary word into the register, and a shift pulse generator for driving the register. The feedback path connects the register as a ring counter which is operative, upon the application of shift pulses, to recirculate the selected address word and thereby generate the continuously repeating address word. In a preferred embodiment, the output of the encoder register is used to key a tone oscillator on and off according to the binary variations of the address stream. This keyed tone is used to modulate a carrier which is transmitted to all the remote receiving stations in the system.

Each receiver includes demodulation and filter circuits for extracting the keyed tone signal from the address modulated carrier, and a decoder preset to recognize reception of an $m$-bit address word unique to that receiver and produce a corresponding call indication. The decoder circuit comprises a shift register having $m$ bistable elements, a detection and shaping circuit for processing the keyed tone signal to reconstruct the digital address stream and serially load it into the shift register, and a shift pulse generator for driving the register. Bit synchronization is provided by using a simple synchronization circuit, such as a differentiator, to derive trigger pulses from the transitions of the processed digital stream for timing the shift pulse generator. A diode logic circuit, such as an AND gate, is connected to the $m$ elements of the shift register in a manner operative to generate a recognition signal in response to the presence of a pre-selected sequence of binary information in the register. Coupled to the output of the diode logic circuit is an integrator or counter for actuating a call indicator only after generation of a selected number of recognition signals; this provision avoids false call indications in response to address words distorted by transient noise interference.

A versatile group and subgroup call capability is provided merely by adjusting the bit length of the repeating address word. In particular, a switch is provided in the feedback path of the encoder shift register. If the switch is set to generate a repeating $n$-bit binary address word with $n$ equal to $m$, only an individual one of the stations will be called. If, however, the switch is set so that the address word length $n$ is longer or shorter than $m$, a group of the receivers can be called. This is accomplished without addition to the decoder circuitry; the diode logic still responds to a preselected $m$-bit binary sequence; the difference during group call is that the transmitted address stream contains $m$-bit binary sequences which match the recognition logic of a selected group of the receivers.

BRIEF DESCRIPTION OF THE DRAWINGS

This invention will be more fully described hereinafter in conjunction with the accompanying drawings, in which.

DETAILED DESCRIPTION OF THE INVENTION

The selective calling system of the invention is operated by transmitting a code stream consisting of a continuously repeating binary function, without spacing or auxiliary signals, for a period of time sufficient to produce a reliable call indication. When this code stream is received by several decoders, only those preset to recognize it will activate the associated call indicator circuitry. For example, the continuous repetition of the 6-bit binary sequence 001101 results in a continuous binary sequence 00110100110100 . . ., which actuates the called decoder. For clarity in this discussion, the repeated binary function will be referred to as the "address word," and the binary sequence resulting from the continuous repetition of the address word will be referred to as the "digital address stream," or simply as the address.

Figures 1, 2:
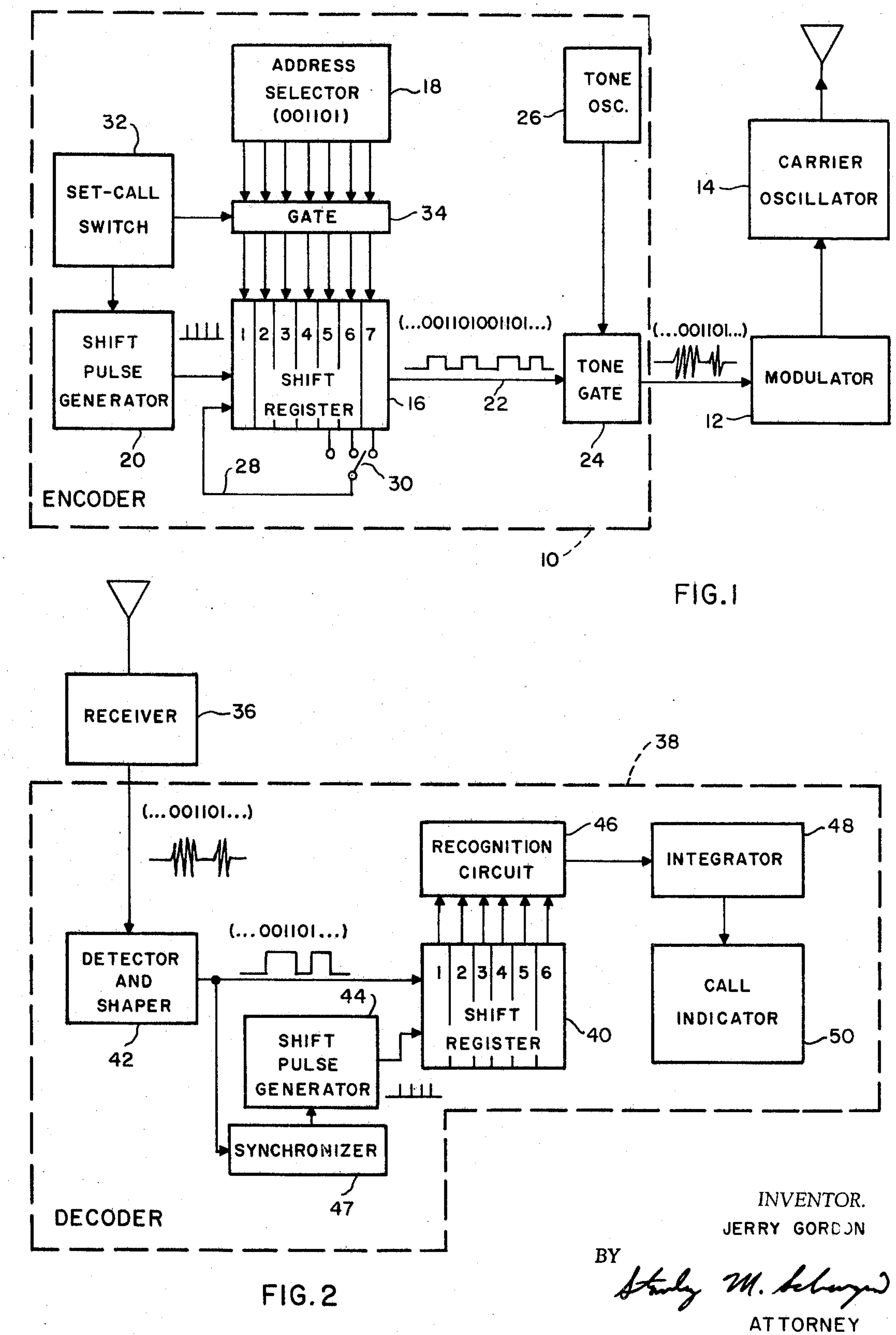
FIG. 1 is a block diagam of a transmitter including a selective call encoder embodying the features of the invention.
FIG. 2 is a block diagram of a receiver including a decoder embodying the features of the invention.

Referring to FIG. 1, a radio transmitter is shown including a selective call encoder 10 in accordance with the invention, a modulator 12 and a carrier oscillator 14. The encoder comprises a shift register 16 from which the digital address stream is generated, an address selector 18 for parallel loading the desired address word into the register 16, and a shift pulse generator 20 for driving register 16.

As illustrated above output line 22, the digital stream generated by the encoder shift register is a binary coded sequence of equal time interval bits, each having a "1" or "0" state. A binary "1" is represented by generation of a first voltage level for a given bit period, and a binary "0" is represented by a second voltage level for the bit period. Generation of $x$ successive 1's results in a constant first voltage level for $x$ successive bit periods, and $x$ successive "0" signals appears as a constant second voltage level for a period of $x$ bits. The resulting digital stream waveform, therefore, is a series of rectangular pulses with sharp transitions from the "1" to "0" and "0" to "1" levels.

Typically this binary information is transmitted by on-off keying, frequency shift keying, amplitude shift keying, phase shift keying, or one of the other modulation techniques available. In the preferred simplified embodiment shown in FIG. 1, the generated digital address stream is applied via output line 22 to a tone gate 24 for keying the output of a tone oscillator 26 on and off. The waveforms at the input and output of the tone gate illustrate the generated address stream and resulting keyed tone signal for continuous repetition of the address word 001101. The keyed tone signal is applied to modulator 12 to modulate the radio frequency output of carrier oscillator 14. The modulator signal is then transmitted to the associated receiving stations.

Considering the encoder circuitry in more detail, the shift register 16 comprises a string of bistable elements, such as flip-flop stages, with a feedback path 28 connecting a register output element through a switch 30 to the "input" element. For example, in FIG. 1 the encoder shift register is illustrated as having seven bistable elements, numbered 1 thru 7, with path 28 connected from element 6 to element 1 through switch 30. In this manner, shift register 16 is connected as a ring counter operative upon application of a train of shift pulses from generator 20 to recirculate a selected 6-bit address word through the register and thereby generate the desired digital address stream at each element of the register. The chosen output appears on output line 22. In the drawing, the register is shown recirculating the selected address word 001101 to generate the stream . . . 001101001101 . . . . If switch 30 were present to element 7, the generated digital stream would comprise a repeating 7-bit word, and if the switch were set to element 5, a 5-bit word would be recirculated. This adjustable word length capability allows the selection of single or group call address streams, as will be described in detail hereinafter.

The address selector circuit may comprise one or more switches for selectively controlling the parallel signal levels applied to establish the respective states of the shift register bistable elements. Since loading and driving are not concurrent operations in the encoder, however, a set-call switch 32 is connected in the circuit to enable and disable pulse generator 20 and to control the operation of a gate 34 interrupting the parallel path connections between the address selector and shift register 16. The set-call switch is normally in the set condition, in which case it produces control signals operative to both inhibit the shift pulse generator 20 and allow the preset address selector signals to load shift register 16 with the desired binary address word. When a call is to be sent, the switch is changed to the call position; in this condition, gate 34 is disabled to prevent further loading of the shift register, and generator 20 is enabled to apply shift pulses to the register and thereby generate the digital address system.

Referring now to FIG. 2, each of the receiving stations associated with the above-described selective calling transmitter comprises a receiver 36, including demodulating and filtering circuits for extracting the keyed tone signal from the address modulated carrier, and a selective call decoder 38 in accordance with the invention' The decoder comprises a shift register 40 having six bistable elements, numbered 1 thru 6, a detector and shaper circuit 42 connected between the output of receiver 36 and an input of bistable element 1 of register 40, a shift pulse generator 44 for driving shift register 40, and a recognition circuit 46 connected to the six bistable elements of the register. The detecting and shaping circuit, as illustrated by its input and output waveforms, processes the received keyed tone signal to reconstruct a digital address stream that is identical to the address stream generated from the encoder shift register 16. This reconstructed digital stream is serially loaded into the shift register and circulated therethrough by the application of shift pulses.

Bit synchronization is provided by connecting a synchronizer 47 between the circuit 42 output and the pulse generator 44 to derive timing signals for synchronizing the shift pulse generator with the bit rate of the reconstructed digital address stream. In this manner, the incoming binary information will be circulated through the register at the same rate at which it is received. The recognition circuit 46 monitors the digital stream circulating through the register and generates a recognition signal pulse whenever the information in the shift register agrees with a preselected recognition setting; for example, if the recognition circuit is preset to recognize the address word 001101 and the information passing through the shift register is 001101001101001101 . . ., circuit 46 will generate a recognition pulse at the end of each 001101 word. These recognition pulses are fed to an integrator 48, which integrates or counts the pulses. Upon storing or counting a selected number of the recognition pulses, the integrator produces an output signal for actuating a call indicator 50. In this manner, the integrator avoids false call indications in the event an address word intended for another station is distorted by transient noise to appear, upon reception, like the word preset to be recognized by decoder 38.

Figure 3:
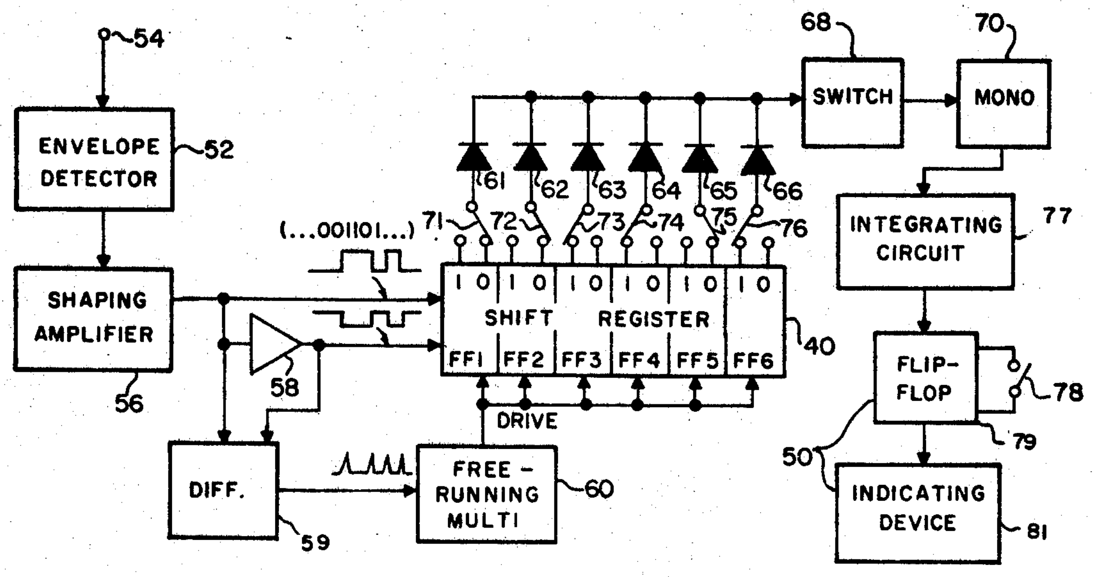
FIG. 3 is a combined circuit schematic and block diagram of a preferred embodiment of a decoder useful in the receiver of FIG. 2.

A preferred embodiment of decoder 38 is illustrated in greater detail in FIG. 3. In this circuit, the reconstructed address stream is provided by an envelope detector 52 coupled to the receiver output, represented by terminal 54, and a shaping amplifier 56 coupled to the envelope detector output and having a bias setting operative to remove any remaining tone frequency "hash" to thereby provide a clean, rectangular waveform at its output. The digital stream output of the shaping amplifier is applied directly to a first load input of shift register 40 and through an inverter 58 to a second load input of the register. Hence, as is normally the practice, both the processed digital address stream and its inverse are serially loaded into the register.

The bit synchronized drive is provided by using a free-running multivibrator 60 as the shift pulse generator and a differentiating circuit 59 as the synchronizer. Both the processed digital stream at the output of amplifier 56 and the inverted stream at the output of circuit 58 are applied as inputs to differentiator 59, where the streams are differentiated and summed together. The negative spikes of the differentiated waveforms are clipped so that positive going trigger pulses are generated at the output of differentiator 59. As a consequence, a derived trigger pulse corresponding to each transition of the processed digital stream is applied to control the timing of multivibrator 60. More specifically, free-running multivibrator 60 is designed to have a frequency slightly less than the shift frequency of encoder pulse generator 20, whereby application of trigger pulses from differentiator 59 is operative to pull the multivibrator into frequency and phase with the bit rate of the information being loaded into register 40.

In FIG. 3, shift register 40 is illustrated as comprising a series of bistable flip-flop circuits, denoted as FF1 thru FF6, each having "1" and "0" outputs. Connected to these shift register outputs in a preset manner is a diode logic circuit for providing the word recognition function. This logic circuit comprises an AND gate, consisting of diodes 61 thru 66 and transistor switch 68, and a monostable multivibrator 70. The AND gate has six inputs, represented by the anodes of diodes 61 thru 66, respectively connected to the "1" or "0" outputs of flip-flops FF1 thru FF6 by means of respective selector switches 71 thru 76. The cathodes of diodes 61 thru 66 are connected in common to the input of switch 68, the output of which represents the output of the AND gate.

The call number, or 6-bit address word, to which this receiver will uniquely respond is determined by the input connections of the six diodes. For example, assure that conventional two transistor flip-flop stages are used in the shift register and that in the "0" state the "0" output transistor conducts and the "1" output transistor is turned off, while in the "1" state the condition of the transistors are reversed. Also assume that the bias arrangement is such that each of the diodes are turned on or off, i.e. conducting or nonconducting, depending on whether the transistor to which its anode is connected is off or on, respectively. Further assume that switch 68 is a transistor which is base controlled by the diodes to conduct when any one or more diodes are conducting and be rendered nonconducting when all of the diodes 61 thru 66 are nonconducting. Thus, if any of the shift register transistors connected to the logic circuit are in the off state, the associated diode will be on and switch 68 will be on. However, if the 6-bit address word in the shift register is such that all of the logic diodes are off, then transistor switch 68 is turned off and a recognition pulse appears at its collector output. This occurs once per word for a duration of one bit. For the switch connections illusrtated in FIG. 3, therefore, the diode logic will generate a recognition pulse in response to each detection of the bistable of the bistable state pattern 001101; this 6-bit address word remaining in the register for one shift period, or bit.

The width of the recognition pulse may vary somewhat, depending on the period of multivibrator 60. Consequently, the recognition pulse is applied to monostable 70, which generates a pulse of constant width.

False call protection is provided by an integrating circuit 77 connected to the output of monostable 70 and having time constants determined by the period between expected recognition pulses. The call indicator 50 comprises a flip-flop 79, adapted to be set by an output signal from the integrating circuit, and an indicating device 81, such as a light bulb or buzzer alarm, adapted to be actuated by the flip-flop 79 output when in the set state. In operation, the recognition pulses generated from monostable 70 are integrated in circuit 77, and, when a preset threshold level is exceeded, an output signal (an amplification of the exceedence) is generated which causes the flip-flop 79 to be held in the set condition, thereby actuating the indicating device 81. Flip-flop 79 includes a manual switch 78, whereby it can be used as a "hold circuit." When switch 78 is open, the flip-flop is biased to reset itself so that the call alarm or light remains "on" only as long as the decoder is being called, i.e. for the duration of the address stream. However, when switch 78 is closed, the light or alarm is turned on with the correct call signal (address) and remains on until the switch is manually opened to reset the flip-flop.

Figure 4:
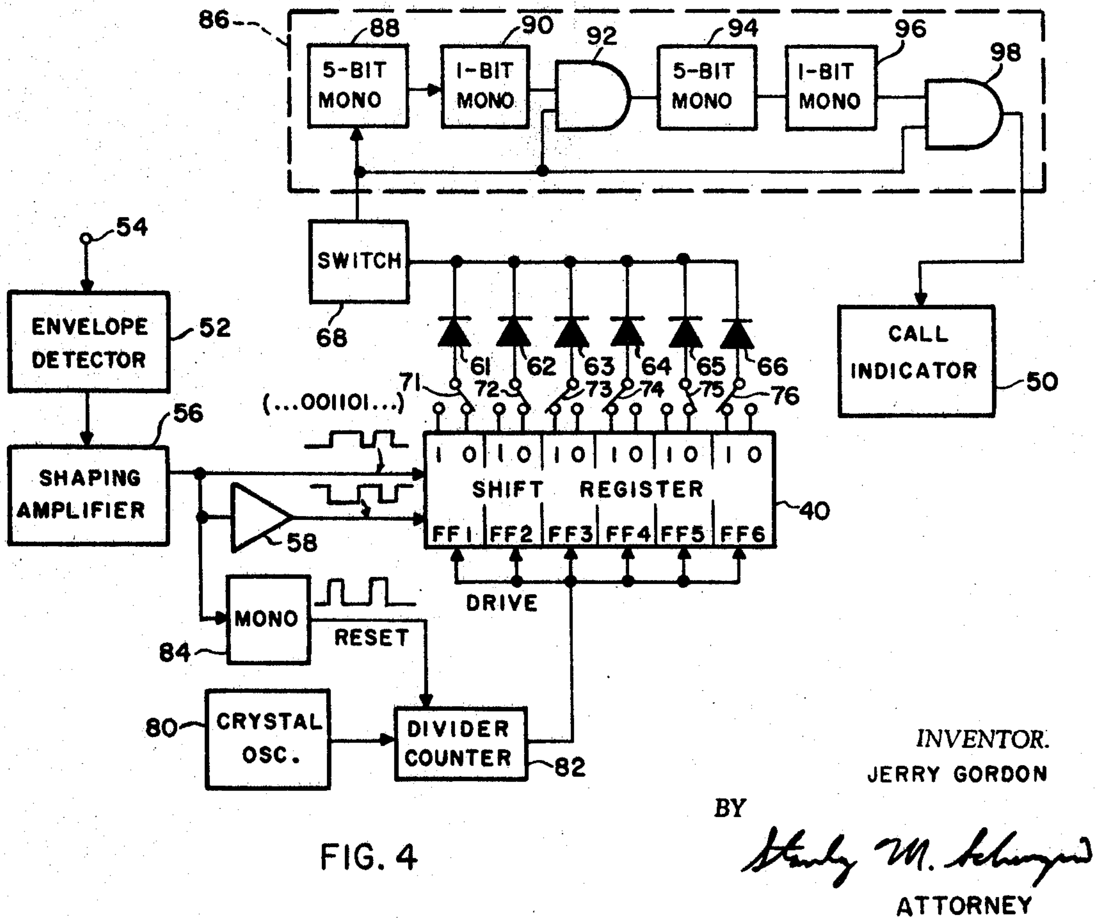
FIG. 4 is a combined circuit schematic and block diagram of an alternate embodiment of a decoder useful in the receiver of FIG. 2.

FIG. 4 illustrates an alternate embodiment of decoder 38. The circuitry for processing the received address stream and loading it into shift register 40 is shown to be the same in FIG. 3, but in this instance, the bit synchronized drive is provided by using (1) a crystal oscillator 80 with a frequency divider 82 connected at its output, as the shaft pulse generator, and (2) a monostable multivibrator 84 as the synchronizer. Frequency divider 82 is preferably a digital counter having its drive input connected to the output of oscillator 80 and its output connected to the shift pulse inputs of register 40. The divider output frequency is the same as the incoming bit rate. The counter is adapted to be reset by applied synchronizing pulses and is connected to the output of monostable 84 for that purpose. The processed digital stream at the output of amplifier 56 is applied to the trigger input of monostable 84, which is adapted to be triggered by only the positive going transition of the digital stream. In this way, monostable 84 is operative to generate a reset pulse, and thereby reset counter 82, every time the address stream transitions are from binary "0" to binary "1." The result is that the generated shift pulse frequency is phase synchronized with the processed digital stream being loaded into register 40.

The recognition AND gate connected at the outputs of shift register 40 is the same as that shown in FIG. 3, i.e. it comprises diodes 61–66 and switch 68; however, in FIG. 4, false call protection is provided by a digital counter 86 connected between switch 68 and call indicator 50. Counter 86 is operative to count the recognition pulses produced from switch 68 and to generate an output signal for actuating the call indicator in response to a selected maximum count. A preferred embodiment of counter 86 is shown comprising; a pair of monostables 88 and 90 serially connected between switch 68 and one input of an AND gate 92 and, another pair of monostables 94 and 96 serially connected between the output of AND gate 92 and one input of an AND gate 98, the output of which is connected to call indicator 50. The output of switch 68 is also connected directly to a second input of each of the AND gates 92 and 98.

Whenever 6 bits of received information that are loaded in shift register 40 match the address word preset by the recognition diode connections, there will be a one bit recognition pulse generated by switch 68. This pulse triggers monostable 88 which is designed to produce a delay of 5 bits duration. At the end of this period, duce a delay of 5-bits duration. At the end of this period, the trailing edge of the 5-bit delay pulse triggers monostable 90, which generates a pulse of one bit duration. This pulse is "anded" with the output of switch 68. If another recognition pulse appears coincident with the delayed recognition pulse, there will be an output from AND gate 92 indicating that two correct and sequential address words have been received. This pulse triggers monostable 94 which produces another 5-bit delay pulse, the trailing edge of which triggers monostable 96, which is of one bit duration. The output of monostable 96 is also "anded" with the switch 68 output. Generation of a pulse from AND gate 98 indicates that three sequential address words have been received correctly. This is the criteria set up for call recognition in this example, so the call indicator will be actuated in response to this count of three pulses.

ADDRESSES AVAILABLE

In the discussion which follows, the length $n$ of the encoder shift register refers to the number of bistable elements of the register which are connected via the feedback path as a ring counter; e.g. in FIG. 1, shift register 16 is illustrated as being connected via path 28 and switch 30 such that $n=6$. Thus, $n$ is also the bit length of the selected address word which is loaded into the encoder register to serve as a starting word for generating the desired address stream.

The number of addresses (i.e., unique binary streams) available is a function of the encoder shift register length $n$. If $n$ is prime, the number of addresses is $(2^n-2)/n$. This is readily seen by noting that there are $2^n-2$ possible starting words, if the unuseable words containing all "ones" and all "zeros" are neglected, and that this total is composed of word groups each of which comprise $n$ words which are merely shifted versions of each other that generate the same binary stream. For example, if the encoder register is connected as a 5-bit ring counter, there are 30 possible starting words. Five of these, such as 00001, 00010, 00100, 01000, 10000, will generate the same output stream. In fact each unique address stream could have 5 possible starting words. Thus, there are 30/5=6 addresses available.

If the length $n$ of the shift register is not prime, the formula for determining the number of possible addresses must take into account address words of length $n$ which contain recurring shorter words. This can best be illustrated by an example: Table I presents the fourteen usable loads, or starting words, for a 4-bit register and the four address streams, denoted A, B, C and D, thereby made available. Three of the addresses, A, B and D, consist of recurring 4-bit words and each could be generated by any one of four possible loads. One address, C, is composed of recurring 2-bit words and could be generated from a choice of two loading conditions. In general, the total number of addresses is the sum of the number of addresses formed of recurring $n$-bit words plus the number of addresses composed of repeating words of shorter length. There will be addresses having word lengths of every factor of $n$. Table II shows the total number of addresses available, $Y(n)$ for shift register lengths up to 16 bits and also lists the number of addresses that contain repeating words of length $n$, denoted $X(n)$.

TABLE I.—POSSIBLE ADDRESSES FROM A FOUR-BIT REGISTER

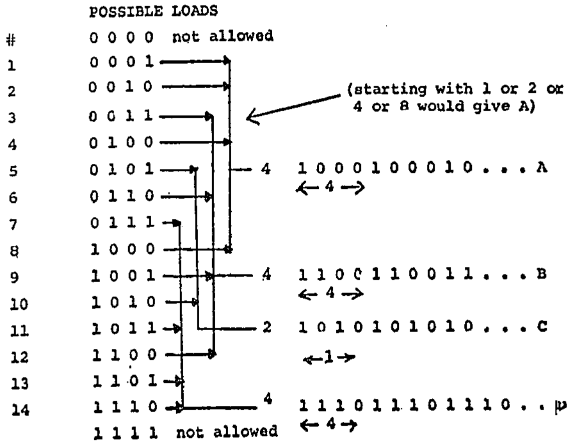

TABLE II.—NUMBER OF ADDRESSES AVAILABLE FOR SHIFT REGISTER LENGTH $n$

| Shift register length $n$ | Addresses with n bits per word $X(n)$ | Total adresses $Y(n)$ |
|---|---|---|
| 2 | 1 | 1 |
| 3 | 2 | 2 |
| 4 | 3 | 4 |
| 5 | 6 | 6 |
| 6 | 9 | 12 |
| 7 | 18 | 18 |
| 8 | 30 | 34 |
| 9 | 56 | 58 |
| 10 | 99 | 106 |
| 11 | 186 | 186 |
| 12 | 335 | 350 |
| 13 | 630 | 630 |
| 14 | 1161 | 1180 |
| 15 | 2182 | 2190 |
| 16 | 4080 | 4114 |

The value of $X(n)$ in Table II may be obtained from the recursive expression:

$$X(n)=\frac{2^n-2-\sum_{i=2}^{n/2}\frac{n}{i}\times\left(\frac{n}{i}\right)}{n}$$

where $$X\left(\frac{n}{i}\right)=0$$

if $n/i$ is not an integer.

The total number of addresses available, $Y(n)$, is the sum of the calculated value of $X(n)$ plus the values of $$X\left(\frac{n}{i}\right)$$

calculated in obtaining $X(n)$; that is, $$Y(n)=X(n)+\sum_{i=2}^{n/2}X\left(\frac{n}{i}\right)$$

where $$X\frac{n}{i}=0$$

if $n/i$ is not an integer.

For example: if $n$ is 12

$$X(12)=\frac{2^{12}-2-\sum_{i=2}^{6}\frac{12}{i}X\left(\frac{12}{i}\right)}{12}$$

$$=\frac{2^{12}-2-6X(6)-4X(4)-3X(3)-2X(2)}{12}$$

$$X(6)=\frac{2^{6}-2-3X(3)-2X(2)}{6}$$

$$X(4)=\frac{2^{4}-2-2X(2)}{4}$$

$$X(3)=\frac{2^{3}-2}{3}=\frac{6}{3}=2$$

$$X(2)=\frac{2^{2}-2}{2}=\frac{2}{2}=1$$

$$X(4)=\frac{16-2-2}{4}=\frac{12}{4}=3$$

$$X(6)=\frac{64-2-6-2}{6}=\frac{54}{6}=9$$

$$X(12)=\frac{4096-2-54-12-6-2}{12}=\frac{4096-76}{12}=\underline{\underline{335}}$$

$$Y(12)=X(12)+X(6)+X(4)+X(3)+X(2)$$
$$=335+9+3+2+1=\underline{\underline{350}}$$

GROUP CALL CAPABILITY

The feature of a group calling capability can be provided in any selective signalling system by adding to each decoder of the group a second recognition circuit preset to the group call address word. Transmission of the group address signal will therefore operate the call indicator in each of these receivers.

A feature of the present invention is that group calls up to a certain number can be obtained without the addition of circuitry to the decoder. With a proper choice of addresses, certain decoder recognition circuits will actuate the associated call indicators upon receiving either the individual call signal for that station or the group call signal. The change in address required is to lengthen or shorten the recurring word in the address stream. The decoder addresses shown in Table III are examples, each address stream being identified by a letter of the alphabet. Only one of the decoders will respond when one of the 6-bit address words shown is used. However, if the address stream is composed of a 5-bit recurring word such as 010110101101011 . . . , all of the decoders shown will actuate their call indicators since there will be a recognition pulse out of the diode logic circuit every fifth shift pulse. Similarly, other binary streams may be chosen to actuate other groups of decoders. A group call address stream may be generated by a recurring address word that is longer or shorter than the decoder shift register. The decoder requirement for this type of group call is that integrator and indicator circuitry be capable of operating whether the recognition pulse occurs once every $n$ pulses or once every $n'$ pulses, where $n'$ is the number of bits in the group call recurring address word. The encoder must be adjustable to longer or shorter words. This is accomplished quite easily, as has been described, by switching the feedback point in the encoder "ring counter." The foregoing may be restated by saying that if the encoder shift register length $n$ is preset so that it equals the decoder shift register length $m$, the capability of calling an individual one of the stations is provided, whereas presetting the bit length of the repeating word so that $n$ is not equal to $m$ provides the capability of selectively calling a group of the receiving stations.

| | Decoder | Decoder recognition |
|---|---|---|
| Unique address stream: | | |
| 010110010110010110 | F | 010110 |
| 011010011010011010 | G | 011010 |
| 101011101011101011 | J | 101011 |
| 101101101101101101 | K | 101101 |
| Group call address: | | |
| 010110101101011 | F, G, J, K | |

TABLE III.—CODING CAPABLE OF GROUP CALL

When making group calls it is sometimes desirable to call a unit that is common to more than one group. This too can be accomplished by a change in the address. For example, in Table IV two groups of decoders (B, E, F, G and G, D, H, J) have one decoder (G) in common and, with the addresses shown, the decoders may be called by groups or individually. In this case the group addresses are generated by recurring 7-bit words.

| Unique address stream | Decoder | | Decoder Recognition |
|---|---|---|---|
| 001100001100001100 | B | I | 001100 |
| 001001001001001001 | E | I | 001001 |
| 011001011001011001 | F | I | 011001 |
| 010011010011010011 | G | I, II | 010011 |
| 001110001110001110 | D | II | 001110 |
| 100111100111100111 | H | II | 100111 |
| 111010111010111010 | J | II | 111010 |

Group I address stream 001001100100110010011.

Group II address stream 001110100111010011101.

TABLE IV.—CODING FOR CALLING GROUPS HAVING ONE DECODER IN COMMON

Calling subgroups

Another arrangement that might be desirable is to provide a group of decoders all of which respond to one call address, but only some of which respond to another. Table V shows, as an example, the address streams required to actuate a group of six decoders or one, two, or three of these at a time. Here to simplify the discussion and notation, each address word representing the respective decoder recognition connections is identified by the decimal number corresponding to its binary form (e.g. address word 001101 is identified by its decimal equivalent 13). If six decoders are connected to recognize the six numbers indicated in line one, it can be seen that the stream containing the 6-bit number 001101 will call all of them as a group. However, by changing the stream to a different number of bits per word as shown in the other lines, the different subgroups of decoders will be operated.

| Address streams: | Six-bit decoders operated |
|---|---|
| 001101001101001101 | **13, 26, 52, 41, 19, 38** |
| 001010010100101 | **41** |
| 010110101101011 | **26** |
| 0010011001001100100 | **19, 38** |
| 001101100110110011011 | **13, 38** |
| 001110100111010011101 | **19, 41, 52** |
| 000110100011010001101 | **13, 26, 52** |

TABLE V.—CODING FOR CALLING SUBGROUPS

Address grouping procedures

A simple method can be used to determine the address words that are part of a group that generate the same address stream. The obvious way, as illustrated by the previously referred to Table I, is to write out one word and shift it $n-1$ times; then find another word that has not been used and shift it to get a second group of words, etc. In Table I, 0001 is shifted three times to obtain 1000, all of which generate the same address stream A; then the word 0011 is shifted three times to obtain a second group of four words which generate the address stream B, etc. It can be seen, however, that shifting left is like doubling the value if the most significant bit is a zero. If the most significant bit is a one, the new value is double the previous value less $(2^n-1)$. Therefore, a table of addresses and corresponding words can be obtained for any length of register $n$. First obtain the words for address A; then use the lowest unused number as the starting word of the next address. Whenever a number obtained exceeds $2^n-1$, subtract $2^n-1$ from it and continue until a number already used is obtained. Then go to the next address, etc. until all values are used. This process can be easily programmed for a computer, and such has been done.

A computer program can also be set up to find which decoder of length $m$ will be called by addresses containing words of length other than $m$. The functions that are to be performed are: (1) "look at" $m$ consecutive bits of the group address, (2) determine which address in the $m$-bit system has this word, (3) shift one bit and repeat steps 1 and 2, (4) continue steps 1, 2 and 3 for as many shifts as there are bits in the group address word, (5) do steps 1 through 4 for each group address. If a computer is not available, the equivalent steps can be performed manually using a combination of decimal and binary numbers.

CALLING RELIABILITY

Another feature of the invention is that it provides protection from false calls and yet still allows a particular receiver to be called when there are errors in the incoming message. This capability is dependent on the integrating circuit, or counter, in the decoder. If the time constant, or other circuit parameter is such that a number of recognition pulses are required before the call indicator is actuated, the wrong call protection is equivalent to that which would be obtained by requiring a word of many bits. On the other hand, by making the charge time of the integrator short compared to its discharge time, the call circuit will still be actuated if some recognition pulses are missed due to errors. The same feature can be provided in the case of a counter by employing a delayed reset so that each recognition pulse will be stored for a period long enough to compensate for a selected number of missed pulses.

ALTERNATE METHODS

The described embodiment of the invention uses one tone for signal transmission, however two tones may be used, with one tone representing a "1" and the other tone representing a "0." Also, the word stream may be used to shift the carrier in an FSK system. Shift rate synchronization can also be accomplished by transmitting shift information. One method, which has been successfully employed is to generate the encoder shift trigger from a selected shift frequency tone and use this tone to continuously modulate the encoder output. At the decoder, the shift frequency tone is filtered, amplified, and clipped so that a decoder shift pulse is obtained for every cycle.

A telephone dial can be used for address selection if a small amount of circuitry is added to accept the pulses and set the starting conditions into the shift register.

It is relatively simple to convert a decoder to an encoder capable of encoding its own address. The additional equipment required would be a transmit-receive switch, a set-call switch, a tone oscillator, a tone gate, and an output circuit. The transmit-receive switch is connected to perform the following functions (referring to FIG. 3) when placed in the "transmit" position: (1) switch the load input to element FF1 of shift register 40 from the output of amplifiers 56 and 58 to element FF6 of the register; (2) open the decoder input during encoding; (3) open the output of recognition circuit switch 68; and (4) connect the cathodes of diodes 61–66 to a supply voltage source. The set-call switch is connected to perform the following functions: (1) when placed in the "set" position, it stops the shift pulse generator (multivibrator 60) and parallel loads the shift register according to the diode connections; and (2) when placed in the "call" position, it starts the shift pulse generator (multivibrator 60). With the transmit-receive switch in the "receive" position and the set-call switch in the "call" position, the equipment operates as a decoder, as previously described.

A further simplification in equipment and operation can be obtained by providing fixed settings for some of the bistable elements of the encoder shift register. For example, a 200 address requirement can be satisfied with a 12-bit shift register by selecting each of the 200 address words so that the first three bits remain fixed, thereby requiring only nine bits to be changeable during address selection.

Although described for use over a standard radio link with audio modulation carrying the address information, the system could be even further simplified by using a cable connection, thereby eliminating the need for a transmitter and receiver. If two wires are used, one for information and one for timing, there would be no need for the tone oscillator, the filter and the synchronizer.

In conclusion, the present invention provides a simple digital method for calling or controlling remote equipment, either individually or in groups. It is simple in that there is no start-stop, preamble or beginning-ending signal associated with the address. Also, one call can actuate a group of receivers without each of the units having group call circuitry in addition to its unique address. Most of the circuitry of the sending unit (encoder) is the same as the circuitry of the receiving unit (decoder); hence, where necessary, an encoder-decoder unit can be built using common circuits. In implementing the equipment, all decoders can be built alike and the address then assigned by interconnecting chosen leads to a recognition circuit. Other features of the system are false call protection and ease of expansion, as well as a multiple address capability at each decoder. A method of obtaining the number of addresses, what they are, and how they can be arranged for group or subgroup calls has been given. In an operating system, the operator need not know the coding theory, but needs only a directory of addresses to choose the proper call.

While particular embodiments of the invention have been illustrated, it is to be understood that the applicant does not wish to be limited thereto, since modifications will now be suggested to ones skilled in the art.

What is claimed is:

1. A selective calling system comprising, a transmitter including means for generating a digital address stream consisting of consecutive repetitions of an address word, said address word composed of a selected $n$-bit sequence of binary information, and a plurality of receiving stations each including: means for receiving said generated digital address stream, means for recognizing reception of a unique address word composed of a preselected $m$-bit sequence of binary information and generating a signal in response to each such recognition, and means operative in response to the generation of a selected number of said recognition signals to produce an indication that the receiving station is being called.

2. A system according to claim 1 wherein the bit length of said repeating word is adjustable, presetting the bit length of said repeating word so that $n$ equals $m$ provides the capability of calling an individual one of said stations, and presetting the bit length of said repeating word so that $n$ is not equal to $m$ provides the capability of selectively calling a group of said receiving stations.

3. A system according to claim 1 wherein said means for generating a digital address stream comprises a first shift register having $n$ bistable elements, means for selecting an address word and loading it into the $n$ elements of said first register, a first pulse generator connected to apply shift pulses to said register, and a feedback path connected from the first element to the $n^{th}$ element of said first register to thereby connect said first register as a ring counter operative upon application of shift pulses to recirculate the selected address word through said first register and generate said digital address stream at each element of said first register.

4. A system according to claim 3 wherein the selected address word is parallel loaded into the elements of said first shift register, and further including means for gating the output of said address word selector, and switching means connected to control the operation of said first pulse generator and said gating means, said switching means having a first condition in which it is operative to both disable said shift pulse generator and allow loading of the selected address word into said register and a second condition in which it is operative to both enable said pulse generator to apply pulses to said register and prevent loading of said shift register.

5. A system according to claim 4 wherein said feedback path includes a switch through which the path from the first element of said first shift register may be connected to either the $m^{th}$ or some other element of the first register, said feedback path switching means thereby enabling adjustment of the bit length of the word to be recirculated through said first register and thus presetting the length of said repeating word so that $n$ equals $m$ or $n$ is not equal to $m$.

6. A system according to claim 5 wherein said transmitter further includes a tone oscillator, means for keying the output of said tone oscillator on and off in accordance with the digital address stream generated from the first element of said first shift register, means for generating a radio frequency carrier, and means for modulating said carrier with said keyed tone signal.

7. A system according to claim 6 wherein said receiving means includes means for demodulating and filtering said modulated carrier to allow only said keyed tone signal to pass, and wherein the address recognition means comprises an envelope detector coupled to the output of said receiving means for processing the received tone signal, a shaping amplifier coupled to the output of said envelope detector for further processing said tone signal to reconstruct a digital address stream that is the same as the stream generated from said first shift register, a second shift register having $m$ bistable elements, means coupling the output of said shaping amplifier directly to a first input of said second register and through an inverter to a second input of said second register for serially loading both the reconstructed digital address stream and its inverse into said second register, a second pulse generator connected to apply shift pulses to said second register, means for synchronizing said second shift pulse generator with the bit rate of the reconstructed digital address stream, and a logic circuit connected to the $m$ elements of said second register in a manner operative to generate a recognition signal in response to the presence of a preselected sequence of binary information in said second shift register.

8. A system according to claim 1 wherein said address recognition means comprises a shift register having $m$ bistable elements, means coupled to the output of said receiving means for processing the received digital address stream and serially loading said processed stream into said shift register, a pulse generator connected to apply shift pulses to said register, means for synchronizing said shift pulse generator with the bit rate of the processed digital address stream, and means for detecting the respective states of the $m$ bistable elements of said shift register and generating a signal in response to detection of a preselected pattern of $m$ bistable states.

9. A system according to claim 8 wherein said shift pulse generator comprises a free-running multivibrator, and said synchronizing means comprises a differentiator having an input to which said processed digital address stream is applied and an output connected to apply tirgger pulses to said mutlivibrator, said differentiator being operative to generate a trigger pulse corresponding to transitions of said processed digital stream to thereby synchronize the frequency and phase of said pulse generator with the bit rate of said processed stream.

10. A system according to claim 8 wherein said shift pulse generator comprises an oscillator and a counter operative as a frequency divider connected between the output of said oscillator and the shift pulse inputs of said register, and wherein said synchronizing means comprises a monostable multivibrator having a trigger input to which said processed digital address stream is applied and an output connected to control the reset of said counter, said monostable being triggered by certain transitions of said processed digital stream to thereby generate corresponding counter reset pulses to phase synchronize the generated shift pulse frequency with the bit rate of said processed stream.

11. A system according to claim 1 wherein said address recognition means comprises a shift register having $m$ bistable elements, means coupled to the output of said receiving means for processing the received digital address stream and serially loading said processed stream into said shift register, a pulse generator connected to apply shift pulses to said register, and a logic circuit connected to the $m$ elements of said register in a manner operative to generate a recognition signal in response to the presence of a preselected sequence of binary information in said shift register.

12. A system according to claim 11 wherein said recognition signal is a pulse, and said call indication means comprises a digital counter coupled to the output of said logic circuit for counting said recognition pulses and generating an output signal in response to a selected maximum count, and a call indicator connected to the output of said digital counter and adapted to be actuated by an output signal therefrom.

13. A system according to claim 11 wherein said recognition signal is a pulse, and said call indication means comprises an integrator coupled to the output of said logic circuit for integrating said recognition pulses and generating an output signal upon exceeding a preset threshold level, and a call indicator connected to the output of said integrator and adapted to be actuated by an output signal therefrom.

14. A system according to claim 13 wherein: each of the bistable elements of said shift register has "1" and "0" outputs; said logic circuit comprises a diode AND gate having $m$ inputs each selectively connected to the "1" or "0" output of a respective one of said $m$ bistable elements, and a monostable multivibrator having a trigger input coupled to the output of said AND gate and an output connected to said integrator; and, said call indicator includes a flip-flop adapted to be set by an output signal from said integrator and to hold said call indication until manually reset.

15. A system according to claim 14 wherein said address recognition means further includes means for synchronizing said shift pulse generator with the bit rate of the processed digital address stream.

16. A system according to claim 15 wherein said shift pulse generator comprises a free-running multivibrator and said synchronizing means comprises a differentiator having an input to which said processed digital address stream is applied and an output connected to apply trigger pulses to said free-running multivibrator, said differentiator being operative to generate a trigger pulse corresponding to each transition of said processed digital stream to thereby phase synchronize said pulse generator frequency with the bit rate of said processed stream.

17. A system according to claim 16 wherein said means for processing the received digital address stream comprises an envelope detector coupled to the output of said receiving means, a shaping amplifier coupled to the output of said envelope detector to provide a rectangular waveform, and means coupling the output of said shaping amplifier directly to a first load input of said shift register and through an inverter to a second load input of said register for serially loading both the processed digital address stream and its inverse into said register.

References Cited

UNITED STATES PATENTS

| | | | |
|---|---|---|---|
| 3,175,191 | 3/1965 | Cohn et al. | |
| 3,384,873 | 5/1968 | Sharma. | |
| 3,408,626 | 10/1968 | Gabrielson | 340—163 |

ROBERT L. GRIFFIN, Primary Examiner

J. A. BRODSKY, Assistant Examiner

U.S. Cl. X.R.

325—302; 328—119; 340—167, 356

UNITED STATES PATENT OFFICE

CERTIFICATE OF CORRECTION

Patent No. 3,510,777 Dated May 5, 1970

Inventor(s) Jerry Gordon

It is certified that error appears in the above-identified patent and that said Letters Patent are hereby corrected as shown below:

Column 1, lines 3 to 5, the portion reading "assignor to Corn Products Company, New York, N.Y., a corporation of Delaware" should read --assignor to Sylvania Electric Products Inc., a corporation of Delaware--.

Column 8, lines 20 and 21, that portion of Table 1 reading 1 0 1 0 1 0 1 0 1 0 . . . . C
←—1—→ should read 1 0 1 0 1 0 1 0 1 0 . . . C
←2→

SIGNED AND SEALED

OCT 27 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
U.S. GOVERNMENT PRINTING OFFICE : 1969 O-366-334